Feb. 14, 1967　　A. E. McCASKEY, JR　　3,304,487
REGULATED ADJUSTABLE POWER SUPPLY HAVING A PRIMARY
CURRENT CONTROLLED BY INPUT AND OUTPUT VOLTAGES
Filed Dec. 16, 1963　　　　　　　　　　　　　　　　2 Sheets-Sheet 1

INVENTOR.
ABNER E. McCASKEY JR.
BY
*Moody & Anderson*
AGENTS

United States Patent Office 3,304,487
Patented Feb. 14, 1967

3,304,487
REGULATED ADJUSTABLE POWER SUPPLY HAVING A PRIMARY CURRENT CONTROLLED BY INPUT AND OUTPUT VOLTAGES
Abner E. McCaskey, Jr., Richardson, Tex., assignor to Collins Radio Company, Cedar Rapids, Iowa, a corporation of Iowa
Filed Dec. 16, 1963, Ser. No. 330,799
11 Claims. (Cl. 321—19)

This invention relates generally to regulated power supplies and more particularly to an improved regulating means for an A.C. to D.C. converter type of power supply wherein the D.C. output voltage is controlled in response to changes in input signal amplitude and frequency and, additionally, in response to output load current.

Various regulating means are known in the art wherein, for example, the output voltage is sampled and the sample employed in a feedback loop to control a series or shunt variable impedances to compensate for increases or decreases in the output voltage.

The output voltage of an A.C. to D.C. converter may be affected by changes in the line voltage and/or frequency as well as by changes in load current. The present invention has as an object therefor the provision of a regulating system for such a power supply wherein the D.C. output voltage may be closely regulated by means responsive to changes in input voltage and frequency as well as by changes in the load.

The present invention operates on a regulating principle wherein the current through the primary winding of the power supply line transformer is controlled by means of advancing or retarding the firing angle of phase controlled switching elements placed in series with the primary winding of the power transformer.

The invention is featured in a novel firing control circuitry to which regulating phase controlled switching elements in series with a power transformer primary winding are responsive. The control circuitry develops line frequency synchronous trigger pulse in response to a predetermined charge being effected on a capacitor. The capacitor charges to a synchronous reference voltage level developed from a current isolated D.C.-wise from the line input signal, and the effective charging rate of the capacitor is varied in response to variations in output voltage level. A dual control feature is thus realized wherein the firing time of phase controlled switching elements during each successive half cycle of the line voltage is dependent upon the output voltage level, and, in addition, is dependent upon line voltage amplitude and frequency. These and other features and objects of the present invention will become apparent upon reading the following description in conjunction with the accompanying drawings in which:

The regulating principle employed in the present invention is that generally described as phase control. Regulation of this sort employs phase controlled rectifying elements in series with the primary winding of a power supply transformer. The phase controlled switching elements are responsive to a triggering or firing signal having a synchronous relationship with the input signal. The time relationship between the triggering signal and the input signal waveform is the controlling feature since the phase controlled switching elements are responsive to the triggering signal to permit predetermined portions of successive half cycles of the input signal to be transformed to the secondary winding of the power transformer. In essence then, the output voltage of the power supply, in being the rectified or average value of the alternating signal developed in the power transformer secondary winding, is a function of the "duty cycle" of the alternating signal being rectified.

The present invention resides in control means for a regulating system as aforedescribed whereby synchronous trigger pulses for firing the phase control switching elements are developed time-wise with respect to the phase of the input line signal as a function of the output voltage from the power supply and, in addition, as a function of input signal voltage and frequency. The dual control feature of the present invention thus maintains a regulated D.C. voltage output through a considerable load current range in spite of appreciable line voltage variations and/or line frequency variations.

Figure 1:
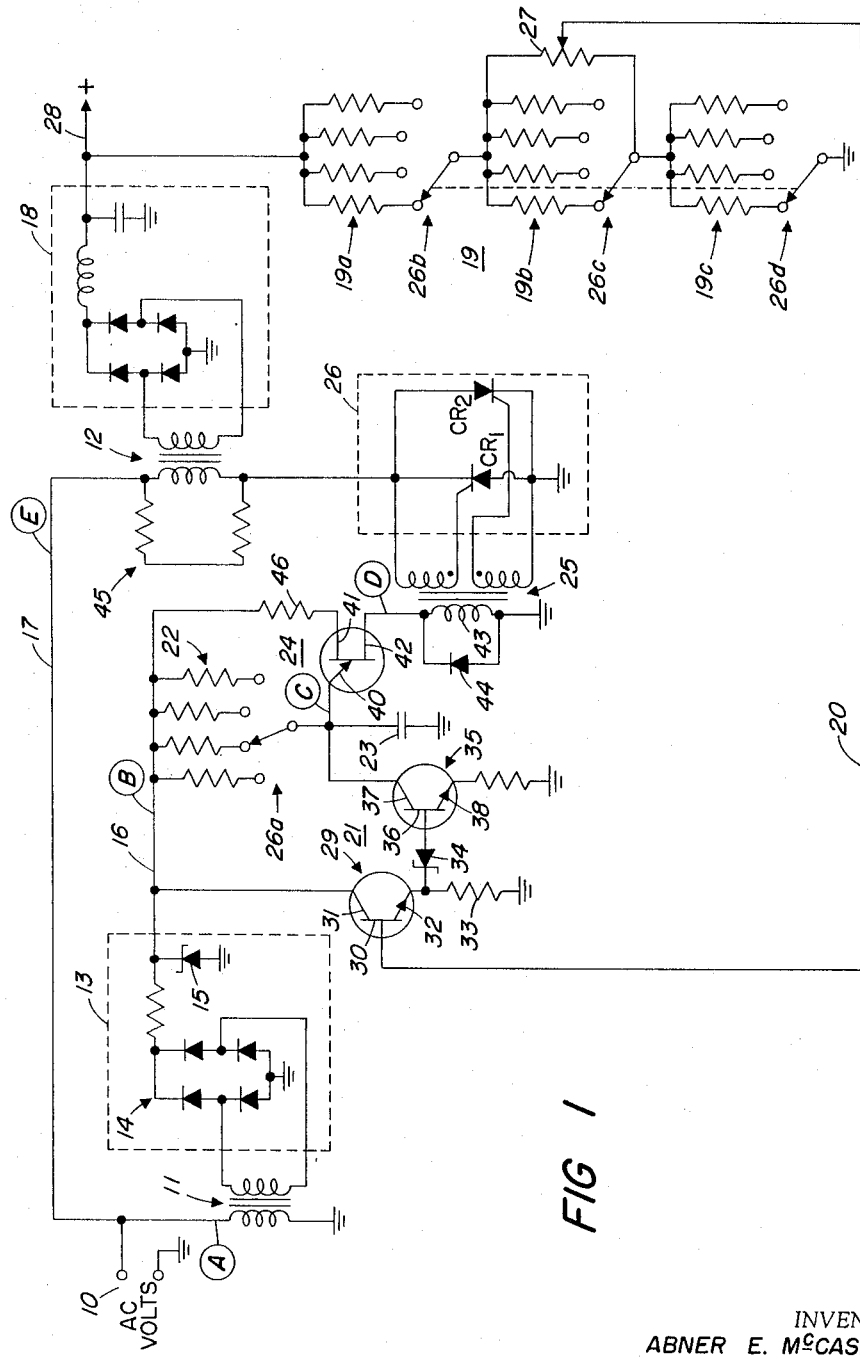
FIGURE 1 is a schematic diagram of an embodiment of the present invention.

With reference to FIGURE 1, a conventional power supply is illustrated as including an input alternating current line voltage 10 applied through line 17 to the primary winding of a power transformer 12. The secondary winding of transformer 12 is connected to a full wave rectifying means 18 the output of which is filtered to develop a D.C. output 28. This circuitry is conventional if one assumes the primary winding of transformer 12 to be returned to common ground as concerns the line input voltage. It is noted, however, that a phase controlled switching circuitry 26 is serially connected between the primary winding of the power transformer 12 and the common ground return. As illustrated, the phase controlled switching circuitry 26 is comprised of first and second voltage controlled rectifier elements connected with opposite polarization in series with the primary winding of the power transformer 12. Elements of this type are "fired" (thereby representing a low impedance path between cathode and anode) should a positive gate or trigger signal be applied to the gating electrode at the time that the anode of the element is positive with respect to the cathodes. The trigger may be momentary and firing is maintained as long as the anode remains positive. The gating electrodes of the voltage controlled rectifiers are seen to be connected to like-polarized ends of first and second secondary windings of a switching transformer 25. Assuming a pulse of current passed through the primary winding 43 of switching transformer 25 at a particular time position within each successive half cycle of the line input voltage 10, the voltage controlled rectifiers, in the arrangement illustrated, will alternately fire and pass through the line power transformer 12, the remaining portion of successive half cycles of the line voltage 10. The rectifier 18 connected to the secondary of the line transformer 12 will develop an output voltage 28 having a level which corresponds to the average level of the alternating signal applied thereto. The D.C. output voltage 28 may then be regulated (reduced or increased) by changing the time occurrence of the trigger signal from transformer 25 during the successive half cycles of the line input voltage 10.

The present invention resides in control circuitry by which the time relationship of the trigger signal for operation of the switching circuitry 26 is controlled as a function of the level of the D.C. output voltage 28 and, additionally, as a function of the amplitude and frequency of the line input voltage 10.

With reference to FIGURE 1, the input line voltage 10, in addition to being applied through line 17 to the power transformer 12, is applied through an isolating transformer 11 to reference voltage development circuitry 13. Circuitry 13 is comprised of a full-wave rectifying arrangement 14 and a Zener diode 15, the latter serving to limit the amplitude of the output from rectifier 14 to a predetermined magnitude. The output 16 from the reference voltage circuit 13 is thus a pulsating D.C. signal with amplitude peaks limited by Zener diode 15. The reference signal 16 is thus a pulsating D.C. reference synchronized with the input line signal 10. Reference signal 16 is applied through an RC network comprised of a selected one of resistors 22 (as inserted by switch 26a) and a capacitor 23. The reference voltage 16 is additionally applied to the collector 31 of a transistor 29 the emitter 32 of which is connected to common ground through a resistor 33. The base 30 of transistor 29 is connected through a feedback line 20 to a voltage dividing network 19 connected from D.C. output terminal 28 to common ground. Network 19 provides a predetermined sample of the output voltage 28 for application to the base of transistor 29. Transistor 29 functions as an emitter-follower such that the voltage developed across its emitter resistor 33 represents the sample voltage taken from the output of the power supply. The emitter 32 of transistor 29 is connected through a Zener diode 34 to the base 36 of transistor 35. The collector-to-emitter circuit of transistor 35 shunts the capacitor 23. A trigger circuit 24 is comprised of a unijunction transistor the emitter 40 of which is connected to the ungrounded terminal of capacitor 23. A first base 41 of unijunction transistor 24 is connected to the reference voltage 16 through a resistor 46. The second base 42 of unijunction transistor 24 is returned to common ground through the primary winding 43 of transformer 25.

In general operation, transistors 29 and 35 might be considered a feedback regulator circuitry responsive to the line voltage reference 16, and the output voltage feedback sample. Unijunction transistor 24 generally operates as a relaxation oscillator synchronized by its innerbase voltage supply. In general, unijunction transistor 24 is fired in response to a predetermined charge being effected on capacitor 23 and when fired, presents a low impedance discharge path for capacitor 23. The rapid discharge of capacitor 23 is passed through the primary winding of transformer 25 to induce, in a secondary winding thereof, the aforedescribed trigger pulses.

The unijunction transistor 24 is a known solid state device which might be described as being a diode with two connections made to one portion of the semiconductor. These devices might also be termed a double-base diode. Their operating characteristic is such that if the voltage applied between emitter 40 and base 42 is greater than one-half the voltage between bases 41 and 42, the device "fires" to present a low impedance path (essentially a short circuit) between the emitter 40 and the base 42.

In operation, when the voltage on capacitor 23 rises to a level corresponding to approximately one-half the voltage across the base elements 41 and 42 of transistor 24, transistor 24 fires and capacitor 23 discharges rapidly through the emitter-base path of transistor 24 and the primary winding of transformer 25 to produce a spike to fire the phase controlled switching elements 26. Switching elements 26 operate as aforedescribed to complete a ground return for the primary winding of power transformer 12 during the remainder of the input signal half cycle. The control feature resides in controlling the time relationship of the trigger spike as it occurs within the half cycles of the line input voltage. The time occurrence of the trigger pulse is controlled by variation of the charging rate of the capacitor 23. The charging rate of capacitor 23 is determined by the state of conduction of transistor 35 which has its collector-to-emitter circuit connected across capacitor 23. When transistor 35 is nonconductive, capacitor C1 charges quite rapidly through the selected one of resistor 22 towards the reference voltage 16 and causes unijunction transistor 24 to "fire" during the first 30° of the half-way period. With the assumption that transistor 35 is nonconductive, the control circuitry produces the longest period of current flow through the windings of power transformer 12 and thus provides the highest voltage obtainable at the output 28. The control feature, however is based on applying a feedback voltage sample to the base of the emitter follower transistor 29, of sufficient magnitude to exceed the breakdown voltage of Zener diode 34. Transistor 35 is thereby forward-biased to the degree by which the feedback voltage developed across the emitter follower resistor 33 exceeds the breakdown voltage of the Zener diode, and thus the conductive state of the transistor 35 varies in accordance with the comparison of the feedback voltage with the reference established by Zener diode 34. Now, should the input voltage 10 rise in magnitude, or should the power supply load current decrease, so that the sample voltage 20 fed back to the base of transistor 29 increases, the voltage across the emitter resistor 33 increases such that it exceeds the Zener diode breakdown voltage by a proportionally greater amount. The forward-bias and conductivity state of the transistor 35 is thus increased. With an increased conductivity state of transistor 35, the collector-to-emitter circuit thereof presents a smaller impedance shunt across the capacitor 23. Thus a larger portion of the charge current through the selected one of resistors 22 is diverted around capacitor 23 so as to increase the capacitor charging period. An increased charging period results in capacitor 23 charging to the predetermined value necessary to effect firing of unijunction transistor 24 at a later time in the input signal half cycle, and thus the portion of successive half cycles of the input signal 10 which are passed through the power transformer 12 are decreased and the output voltage 28 is correspondingly reduced. Conversely, should input voltage decrease or the power supply load current increase, so that the sample voltage 20 fed back to the base of transistor 29 decreases, transistor 29 becomes less conductive to decrease the voltage across its emitter resistor 33, thus decreasing the forward bias of transistor 35 and reducing its conductivity state such that the charging period of capacitor 23 is shortened. The trigger spikes are generated earlier in the half cycle periods and thus the output voltage increases accordingly.

Figure 2:
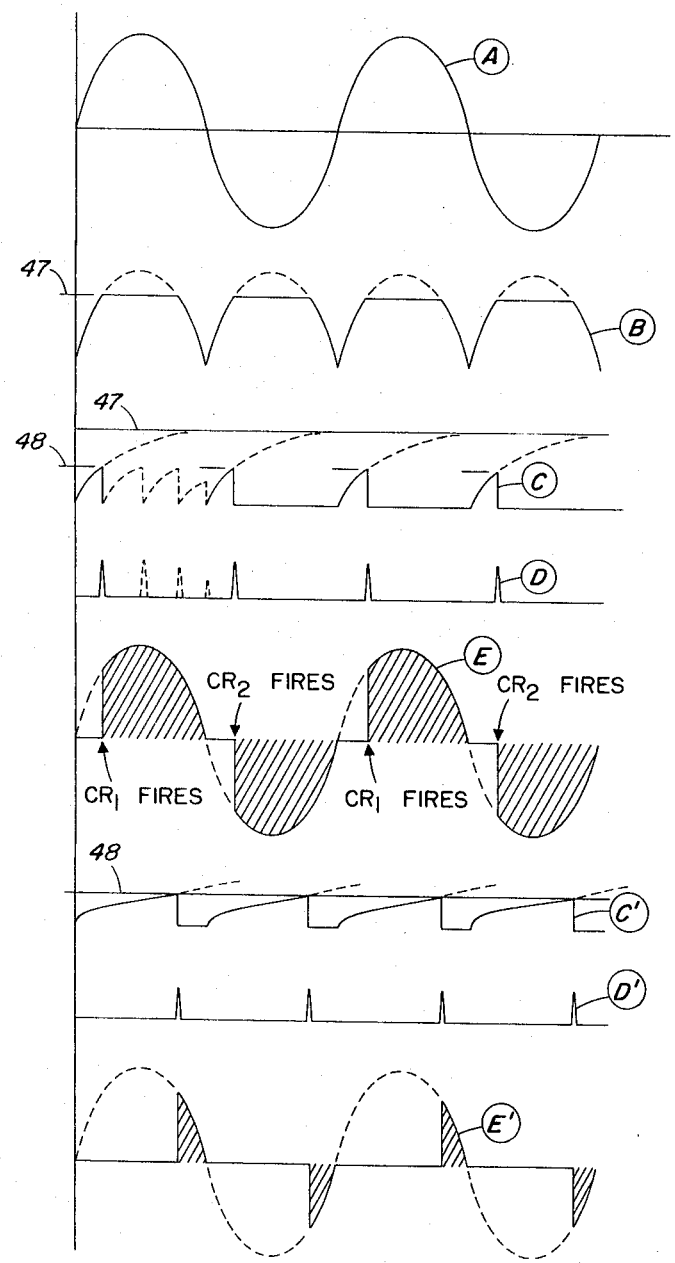
FIGURE 2 is a diagrammatic representation of the operational wave forms of the embodiment of FIGURE 1.

The operation of the control feature in accordance with this invention is illustrated by the waveforms of FIGURE 2. Waveform A represents the line input voltage. Waveform B represents the pulsating D.C. output from the voltage reference circuitry 13 with successive half cycles being limited at a level 47 corresponding to the breakdown voltage of the Zener diode 15. Waveform C represents the voltage across capacitor 23. It is noted that capacitor 23 charges towards the peak level 47 of waveform B during each half-cycle of the input signal A and rapidly discharges when the charge thereon reaches a voltage level 48 which is essentially one-half the reference voltage peak 47. As previously discussed, when the charge on capacitor 23 reaches this level, unijunction transistor 24 fires to provide an extremely low impedance discharge path for capacitor 23 through the primary winding of triggering transformer 25. Waveform D represents the trigger spikes which are generated in pulse transformer 23 in response to the successive discharge periods of capacitor 23.

Being concerned for the moment with the bold-line waveforms C and D, it is noted that waveform E represents the signal applied to the primary of line transformer 12 wherein successive ones of triggering spikes D alternately fire voltage controlled rectifiers CR1 and CR2 and permit passage of the remaining portion of the half cycles through line transformer 12.

It is noted that wave forms C and D include dotted configurations between the solid line portions since, in operation, capacitor 23 may charge to the firing point of unijunction transistor 24 a second or third time after it has been discharged during any one-half cycle period. The trigger spikes shown in dotted line configuration have no effect because the switching control 26 remains conductive until the input signal A reaches the zero crossover, a characteristic inherent in the operation of the voltage controlled rectifiers CR1 and CR2. Thus, only the first of the trigger spikes D developed during a half-cycle period is effective as concerns control of the phase controlled switching circuitry 26. It is necessary, however, that capacitor 23 be discharged at the end of each half-cycle and this is accomplished because of the characteristic of the unijunction transistor 24. Even though the voltage of the capacitor 23 is quite low, unijunction transistor 24 will fire to discharge capacitor 23 as the reference voltage B applied to the base 41 of transistor 24 approaches zero.

FIGURE 2 illustrates wave forms C', D' and E' which illustrate operational wave forms resulting from an increased output voltage 28. For such a condition, an increased voltage sample is fed to the regulating system to increase the conductivity state of transistor 35 as aforedescribed, and the charging time of capacitor 23 is effectively increased. Here again, capacitor 23 charges towards the reference voltage level 47, but at a slower rate, such that the triggering threshold level 48 is reached at a later time in the half-cycle period. The resulting triggering spikes D' fire voltage controlled rectifier CR1 and CR2 later in the half-cycle periods and a correspondingly smaller portion of the successive half cycles of input signal A are applied through line transformer 12 to the output rectifier 18. The output voltage 28 is thus decreased.

The present invention permits output voltage regulation over a considerable range. The embodiment of FIGURE 1 milght include an output voltage sampling means 19 as illustrated wherein the power supply may be adapted for regulation at four selected output voltage levels. For this purpose the output voltage sampling means 19 may comprise a voltage divider arrangement comprised of three groups of parallelled resistors 19a 19b, and 19c, selected resistors of which form a voltage divider in accordance with the positioning of ganged switches 26b, 26c, and 26d. The feedback voltage 20 for control purposes then becomes a portion of the voltage drop across the selected ones of resistors 19a and 19c as determined by the adjustment of potentiometer 27. The values of the particular resistors for each of the four switch positions are predetermined such that the bleeder resistance is tapped up or down to maintain a uniform bleeder current for all output voltage levels. A fourth switch section 26a correspondingly selects a particular one of the resistors 22 in the capacitor 23 charging circuit to establish an RC time constant consistent with the selected output voltage levedl; it being understood that the output voltage level is, as aforedefined, a function of the time occurrence of the triggering spikes within the half-cycle periods of the line voltage 10. Thus a greater time constant, as would be inserted by a larger value of a selected transistor 22 in the capacitor charging circuit, would set the output at lower level; while the selection of a resistor 22 of a lesser magnitude would correspondingly decrease the time constant of the RC network and increase the output voltage level.

In the embodiment of FIGURE 1, the primary winding of line transformer 12 is shunted by a resistance 45 to provide the voltage controlled rectifiers CR1 and CR2 with the required holding current. Due to the inductive load of the line transformer 12 primary winding, the triggering signal might be removed before the holding current could build up in the absence of the shunting resistance 45. Further, a diode 44 is connected across the primary of the pulse transformer 25 to clip the negative flyback voltage developed within the transformer.

The present invention is thus seen to provide a multirange regulating power supply wherein regulation is effected in response to changes in output load and in addition to input line voltage and frequency. Since the regulating principle operates upon the blocking of voltage, no power is wasted internally and the invention permits an increased power output for a given physical size requirement.

Although the invention has been described with respect to a particular embodiment thereof, it is not to be so limited as changes might be made therein which fall within the scope of the invention as defined in the appended claims.

I claim:

1. In a power supply for converting an input alternating current signal to a direct current output voltage, said power supply including a power transformer the primary windings of which receive said input signal, voltage rectifying means connected to secondary winding of said power transformer and producing a direct current output voltage; means for regulating said direct current output voltage comprising full wave voltage controlled rectifying means serially connected with said input signal and the primary winding of said power transformer, said voltage controlled rectifying means being responsive to an input trigger signal thereto to fire and pass therethrough predetermined portions of successive half cycles of said input signal, reference voltage full wave rectifying means receiving said input signal and developing therefrom a pulsating direct current reference, means applying said reference voltage through an RC network, said network comprising a resistor and a capacitor respectively serially connected with the output from said network being the voltage across said capacitor, means sampling said direct current output voltage, feedback control means connected to said RC network and receiving the output of said sampling means and in response thereto effecting a variation in the charging rate of said RC network, and means developing said trigger signal in response to a predetermined charge being effected on said capacitor during each successive half cycle of said input signal.

2. In a power supply for converting an input alternating current signal to a direct current output voltage, said power supply including a power transformer the primary windings of which receive said input signal, voltage rectifying means connected to secondary winding of said power transformer and producing a direct current output voltage; means for regulating said direct current output voltage comprising full wave voltage controlled rectifying means serially connected with said input signal and the primary winding of said power transformer; said voltage controlled rectifying means being responsive to an input trigger signal thereto to fire and pass therethrough predetermined portions of successive half cycles of said input signal, said voltage means comprising first and second voltage controlled rectifiers each including a gating element, an anode, and a cathode, said first and second voltage controlled rectifiers being serially connected in mutually opposite polarization with the primary winding of said power transformer and said input signal, said trigger signal being applied to the gating element of each of said voltage controlled rectifiers whereby said voltage controlled rectifiers fire on alternate half cycles of said input signal to pass predetermined portions of successive half cycles of said input signal to said power transformer primary winding; reference voltage full wave rectifying means receiving said input signal and developing therefrom a pulsating direct current reference voltage; means applying said reference voltage through an RC network, said network comprising a resistor and a capacitor respectively serially connected with the output from said network being the voltage across said capacitor, means sampling said direct current output voltage, feedback control means connected to said RC network and receiving the output of said sampling means and in response to variations thereof effecting a variation in the charging rate of said RC network, and means developing said trigger signal in response to a predetermined charge being affected on said capacitor during successive half cycles of said input signal.

3. Regulating means as defined in claim 2 wherein the means for developing said trigger signal comprises a unijunction transistor, said capacitor being connected serially with the primary winding of a switching control transformer between the emitter element of said unijunction transistor and a first base element thereof, said reference voltage being applied to a second base element of said unijunction transistor, the junction between said capacitor and said switching control transformer primary winding being referenced to the common return for said reference voltage, said unijunction transistor in response to said predetermined charge being effected on said capacitor, providing a low impedance path from the emitter element thereof to said second base element in response to which said capacitor is discharged through the primary winding of each switching control transformer, said switching control transformer including secondary winding means within which said trigger signal is developed.

4. Regulating means as defined in claim 3 wherein said feedback control means comprises a first transistor having a collector element connected to said reference voltage, a base element connected to said sampling voltage and an emitter connected through a resistor to the common return for said reference voltage, a Zener diode connected between the emitter of said first transistor and the base element of a second transistor, the emitter-collector circuit of said second transistor shunting said RC network, the emitter element of said second transistor being referenced to the common return for said reference voltage whereby the emitter-base bias of said second transistor is a function of the degree by which the output of said sampling means exceeds the breakdown voltage of said Zener diode, the emitter-collector circuit of said second transistor thereby providing a shunting impedance for said capacitance which varies as a function of the emitter-base bias of said second transistor.

5. In a power supply for converting an input alternating current signal to a direct current output voltage, said power supply including a power transformer the primary winding of which receives said input signal, voltage rectifying means connected to the secondary winding of said transformer and producing a direct current output signal; means for regulating said direct current output signal comprising, full wave voltage controlled rectifying means serially connected with said input signal and the primary winding of said power transformer, said voltage controlled rectifying means being responsive to an input trigger signal thereto to fire and pass therethrough predetermined portions of successive half cycles of said input signal, second full wave rectifying means receiving said input signal and developing therefrom a pulsating direct current voltage reference, means applying said reference voltage through an RC network, voltage variable impedance means shunting a capacitor element of said RC network, said voltage variable impedance means comprising a first transistor the emitter-to-collector path of which shunts said capacitor, means sampling said direct current output voltage, control means interconnected with said sampling means and said voltage variable impedance means to effect a variation in said variable impedance as a function of said sample voltage, said control means effecting variation of the conductive state of said first transistor as a function of the difference voltage between said sample voltage and a predetermined reference voltage level, said control means comprising a second transistor having a collector element connected to said reference voltage, a base connected to said sampling voltage and an emitter connected through a resistor to the common return for said reference voltage, a Zener diode connected between the emitter of said second transistor and the base of said first transistor, the emitter element of said first transistor being referenced to the common return for said reference voltage whereby the emitter-base bias of said first transistor is a function of the degree by which said sampling voltage exceeds the breakdown voltage of said Zener diode, and means for developing said trigger signal in response to a predetermined charge on said capacitor element being effected.

6. In a power supply for converting an input alternating current signal to a direct current output voltage, said power supply including a power transformer the primary winding of which receives said input signal, voltage rectifying means connected to the secondary winding of said transformer and producing a direct current output signal; means for regulating said direct current output signal comprising, full wave voltage controlled rectifying means serially connected with said input signal and the primary winding of said power transformer, said voltage controlled rectifying means being responsive to an input trigger signal thereto to fire and pass therethrough predetermined portions of successive half cycles of said input signal, second full wave rectifying means receiving said input signal and developing therefrom a pulsating direct current voltage reference, means applying said reference voltage through an RC network, voltage variable impedance means shunting a capacitor element of said RC network, means sampling said direct current output voltage, control means interconnected with said sampling means and said voltage variable impedance means to effect a variation in said variable impedance as a function of said sample voltage, and means for developing said trigger signal in response to a predetermined charge on said capacitor element being effected said last named means comprising threshold sensitive switching means including a gating element to which the charge on said capacitor is applied a switching control transformer the primary winding of which is serially connected with said switching means and said reference voltage, said switching means being responsive to said predetermined charge on said capacitor to provide a low impedance discharge path for said capacitor through the primary winding of said switching control transformer, and secondary windings of said switching control transformer having developed therein said trigger signal and being connected to said voltage controlled rectifying means to control the firing thereof.

7. In a power supply for converting an input alternating current signal to a direct current output voltage, said power supply including a power transformer the primary winding of which receives said input signal, voltage rectifying means connected to the secondary winding of said transformer and producing a direct current output signal; means for regulating said direct current output signal comprising, full wave voltage controlled rectifying means serially connected with said input signal and the primary winding of said power transformer, said voltage controlled rectifying means being responsive to an input trigger signal thereto to fire and pass therethrough predetermined portions of successive half cycles of said input signal, second full wave rectifying means receiving said input signal and developing therefrom a pulsating direct current voltage reference, means applying said reference voltage through an RC network, voltage variable impedance means shunting a capacitor element of said RC network, means sampling said direct current output voltage, control means interconnected with said sampling means and said voltage variable impedance means to effect a variation in said variable impedance as a function of said sample voltage, and means for developing said trigger signal in response to a predetermined charge on said capacitor element being effected, last named means comprising a unijunction transistor, said capacitor being connected serially with the primary winding of a switching control transformer between the emitter element of said unijunction transistor and a first base element thereof, said reference voltage being applied to a second base element of said unijunction transistor, the junction between said capacitor and said switching control transformer primary winding being referenced to the common return for said reference voltage, said unijunction transistor, in response to said predetermined charge being effected on said capacitor, providing a low impedance path from the emitter element thereof to said second base element in response to which said capacitor is discharged through the primary winding of said switching control transformer, said switching control transformer including secondary winding means within which said trigger signal is developed.

8. In a power supply for converting an input alternating current signal to a direct current output voltage, said power supply including a power transformer the primary winding of which receives said input signal, voltage rectifying means connected to the secondary winding of said transformer and producing a direct current output signal; means for regulating said direct current output signal comprising, full wave voltage controlled rectifying means serially connected with said input signal and the primary winding of said power transformer, said voltage controlled rectifying means being responsive to an input trigger signal thereto to fire and pass therethrough predetermined portions of the successive half cycles of said input signal, a second full wave rectifying means receiving said input signal and developing therefrom a pulsating direct current voltage reference, means applying said reference voltage through an RC network, voltage variable impedance means shunting a capacitor element of said RC network, means sampling said direct current output voltage, control means interconnected with said sampling means and said voltage variable impedance means to effect a variation in said variable impedance as a function of said sample voltage, and means for developing said trigger signal in response to a predetermined charge on said capacitor element being effected, said voltage controlled rectifying means comprising first and second voltage controlled rectifiers each including a gating element, an anode, and a cathode, said first and second voltage controlled rectifiers each serially connected in mutually opposite polarization with the primary winding of said power transformer and said input signal, and said trigger signal being applied to the gating element of each of said voltage controlled rectifiers whereby said phase controlled rectifiers fire on alternate half cycles of said input signal to pass predetermined portions of successive half cycles of said input signal to said power transformer primary winding.

9. In a power supply for converting an input alternating current signal to a direct current output voltage, said power supply including a power transformer the primary winding of which receives said input signal, voltage rectifying means connected to the secondary winding of said transformer and producing a direct current output signal; means for regulating said direct current output signal comprising, full wave voltage controlled rectifying means serially connected with said input signal and the primary winding of said power transformer, said voltage controlled rectifying means being responsive to an input trigger signal thereto to fire and pass therethrough predetermined portions of successive half cycles of said input signal, second full wave rectifying means receiving said input signal and developing therefrom a pulsating direct current voltage reference, means for limiting the output of said second full wave rectifying means at a predetermined level, means applying said reference voltage through an RC network, voltage variable impedance means shunting a capacitor element of said RC network, means sampling said direct current output voltage, control means interconnected with said sampling means and said voltage variable impedance means to effect a variation in said variable impedance as a function of said sample voltage and means for developing said trigger signal in response to a predetermined charge on said capacitor element being effected.

10. In a power supply for converting an input alternating current signal to a direct current output voltage said power supply including a power transformer the primary winding of which receives said input signal, a resistive means shunting the primary winding of said power transformer, voltage rectifying means connected to the secondary winding of said transformer and producing a direct current output signal; means for regulating said direct current output signal comprising full wave voltage controlled rectifying means serially connected with said input signal and the primary winding of said power transformer, said voltage controlled rectifying means being responsive to an input trigger signal thereto to fire and pass therethrough predetermined portions of successive half cycles of said input signal, second full wave rectifying means receiving said input signal and developing therefrom a pulsating direct current voltage reference, means applying said reference voltage through an RC network, voltage variable impedance means shunting a capacitor element of said RC network, means sampling said direct current output voltage, control means interconnected with said sampling means and said voltage variable impedance means to effect a variation in said variable impedance as a function of said sample voltage, and means for developing said trigger signal in response to a predetermined charge on said capacitor element being effected.

11. In a power supply for converting an input alternating current signal to a direct current output voltage, said power supply including a power transformer the primary winding of which receives said input signal, voltage rectifying means connected to the secondary winding of said transformer and producing a direct current output signal; means for regulating said direct current output signal comprising, full wave voltage controlled rectifying means serially connected with said input signal and the primary winding of said power transformer, said voltage controlled rectifying means being responsive to an input trigger signal thereto to fire and pass therethrough predetermined portions of successive half cycles of said input signal, second full wave rectifying means receiving said input signal and developing therefrom a pulsating direct current voltage reference, said second full wave rectifying means comprising an isolating transformer the primary winding of which receives said input signal and the secondary winding of which is connected to full wave rectifying means for development of said reference voltage, means applying said reference voltage through an RC network, voltage variable impedance means shunting a capacitor element of said RC network, means sampling said direct current output voltage, control means interconnected with said sampling means and said voltage variable impedance means to effect a variation in said variable impedance as a function of said sample voltage, and means for developing said trigger signal in response to a predetermined charge on said capacitor element being effected.

References Cited by the Examiner

UNITED STATES PATENTS 2,810,877 10/1957 Silver _____ 321—19
3,146,392 8/1964 Sylvan.
3,221,183 11/1965 White.

JOHN F. COUCH, *Primary Examiner.*

M. L. WACHTELL, *Assistant Examiner.*